United States Patent
Gui

(10) Patent No.: US 10,760,808 B2
(45) Date of Patent: Sep. 1, 2020

(54) INVERTER AIR CONDITIONER CONTROL DEVICE, TERMINAL, SYSTEM AND METHOD BASED ON THERMOLATOR

(71) Applicants: GD MIDEA AIR-CONDITIONING EQUIPMENT CO., LTD., Foshan, Guangdong (CN); MIDEA GROUP CO., LTD., Foshan, Guangdong (CN)

(72) Inventor: Dafa Gui, Guangdong (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 202 days.

(21) Appl. No.: 15/529,493

(22) PCT Filed: Jan. 27, 2016

(86) PCT No.: PCT/CN2016/072321
§ 371 (c)(1),
(2) Date: May 24, 2017

(87) PCT Pub. No.: WO2017/088304
PCT Pub. Date: Jun. 1, 2017

(65) Prior Publication Data
US 2018/0031263 A1    Feb. 1, 2018

(30) Foreign Application Priority Data

Nov. 26, 2015  (CN) .......................... 2015 1 0848153

(51) Int. Cl.
*F24F 11/00*    (2018.01)
*F24F 11/46*    (2018.01)
(Continued)

(52) U.S. Cl.
CPC .............. *F24F 11/46* (2018.01); *F24F 11/63* (2018.01); *F24F 11/64* (2018.01); *F24F 11/70* (2018.01);
(Continued)

(58) Field of Classification Search
CPC ............. F24F 11/46; F24F 11/63; F24F 11/85
See application file for complete search history.

(56) References Cited

U.S. PATENT DOCUMENTS

2010/0023168 A1*  1/2010  Kai .......................... F24F 11/30
                                                          700/278
2014/0135998 A1*  5/2014  Cao ..................... G05D 23/1934
                                                          700/278
2014/0188313 A1*  7/2014  Huang ............... B60H 1/00392
                                                          701/22

FOREIGN PATENT DOCUMENTS

CN        101517326 A       8/2009
CN        105299848 A       2/2016
(Continued)

OTHER PUBLICATIONS

International Search Report of PCT Patent Application No. PCT/CN2016/072321 dated Sep. 7, 2016.

*Primary Examiner* — Elizabeth J Martin
*Assistant Examiner* — Nael N Babaa
(74) *Attorney, Agent, or Firm* — Anova Law Group PLLC

(57) ABSTRACT

The present disclosure provides an inverter air conditioner control device based on a thermolator, which includes: a first controller, and an input interface, an outdoor unit communicating interface and a detecting interface all connected with the first controller, and an indoor unit controlled by a second controller, wherein, the input interface is connected with the thermolator, receives a control signal sent by the thermolator; the detecting interface is connected with a
(Continued)

temperature detector, receives an indoor temperature signal; the first controller connects with a inverter air conditioner outdoor unit, controls an operation of the inverter air conditioner outdoor unit; the first controller sets a target reference temperature which is used for adjusting an operation frequency of a compressor of the inverter air conditioner outdoor unit. The present disclosure also provides a terminal, an inverter air conditioner control system and control method based on the thermolator.

20 Claims, 8 Drawing Sheets

(51) Int. Cl.
| | | |
|---|---|---|
| *F24F 11/85* | (2018.01) | |
| *F24F 11/63* | (2018.01) | |
| *F24F 11/64* | (2018.01) | |
| *F24F 11/70* | (2018.01) | |
| *G05D 23/19* | (2006.01) | |
| *F24F 110/10* | (2018.01) | |

(52) U.S. Cl.
CPC .......... *F24F 11/85* (2018.01); *G05D 23/1931* (2013.01); *F24F 2110/10* (2018.01)

(56) References Cited

FOREIGN PATENT DOCUMENTS

| | | | |
|---|---|---|---|
| CN | 105318505 A | 2/2016 | |
| CN | 205245452 U | 5/2016 | |
| CN | 205245453 U | 5/2016 | |
| CN | 205245455 U | 5/2016 | |
| JP | 2009186095 A * | 8/2009 | ............... F24F 11/30 |
| JP | 2009186095 A | 8/2009 | |
| JP | 20099186095 A1 * | 8/2009 | ............... F24F 11/02 |

* cited by examiner

INVERTER AIR CONDITIONER CONTROL DEVICE, TERMINAL, SYSTEM AND METHOD BASED ON THERMOLATOR

FIELD OF THE DISCLOSURE

The present disclosure relates to the field of air conditioner, and in particular, to an inverter air conditioner control device, terminal, system, and method based on a thermolator.

BACKGROUND OF THE DISCLOSURE

Thermostat is a controller of the air conditioner commonly used in North America and Latin America, the thermostat has safety voltage power supply and controlled load. Users can set the controlling temperature, the operation mode, the operation wind speed of the thermostat, and so on. A sensor used for detecting indoor temperature is located inside the thermostat, and which is used for detecting the indoor temperature. Thermostat can control the operation of the air conditioner according to the set temperature, mode, wind speed and indoor environment temperature. Referring to FIG. 1, control signals outputted by the thermostat include at least one channel inner blower fan control signal G, and one channel compressor control signal Y, can also be multiple channels inner blower fan control signals, multiple channels compressor control signals, can also be one channel four-way valve or multi-channels four-way valve B, electric heating control signal W, and so on. The above control signals are all on-off control signals, can control the on or off of the load of the air conditioner. Thermostat controls the operation function of the air conditioner under different modes through outputting corresponding load on control signal or load off control signal, such as, in refrigeration mode, the refrigeration function can be realized through outputting compressor starting signal, inner blower fan starting signal, four-way valve shutdown signal, and so on, in heating mode, the heating function can be realized through outputting compressor starting signal, inner blower fan starting signal, four-way valve opening signal, and so on. The control proposal of the thermostat can be the control of fixed frequency unit, such as, includes:

24V control fixed frequency outdoor unit, which can receive outdoor 24V control signal (compressor, four-way valve, and so on), and open corresponding load to operate.

24V control fixed frequency indoor unit, which can receive outdoor 24V control signal (inner blower fan), and open corresponding load to operate.

However, the control proposal can only control fixed frequency unit, cannot control the frequency converter, as the control signals of the the frequency converter are not the above simple load on control signal or load off control signal, relate to the complexity of the frequency and various protection signals, control signals control the work of the load through a mean of communication protocol. So, the existed control proposal limits the application of the air conditioner, which causes the intelligent degree of the air conditioner control process bad.

The above content can only be used for assisting the understanding of the technical proposal of the present disclosure, and cannot be considered as an admission that the above content is existed technology.

SUMMARY OF THE DISCLOSURE

The main aim of the present disclosure is to provide an inverter air conditioner control device, terminal, system and method based on a thermolator, which aims to solve the technical problem of that the proposal of the existed proposal of the air conditioner controlled by the thermolator can only control the fixed frequency unit, which causes the application of the air conditioner is limited, and the intelligent degree of the air conditioner control process is bad.

In order to achieve the aim, the present disclosure provides an inverter air conditioner control device based on a thermolator, which includes: a controller, an input interface, an outdoor unit communicating interface and a detecting interface all connected with the controller, wherein, the input interface is connected with the thermolator, receives a control signal sent by the thermolator; the detecting interface is connected with a temperature detector, receives an indoor temperature signal acquired by the temperature detector; the controller connects with the inverter air conditioner outdoor unit by the outdoor unit communicating interface, controls an operation of an inverter air conditioner outdoor unit; the controller sets a target reference temperature which is used for adjusting an operation frequency of a compressor of the inverter air conditioner outdoor unit according to a shutdown control signal of the thermolater and the indoor temperature signal acquired by the temperature detector.

Preferably, the temperature detector is installed on the thermolator.

Preferably, the inverter air conditioner control device based on the thermolator further includes: the temperature detector connected with the detecting interface.

Preferably, the detecting interface is connected with an indoor unit, receives the indoor temperature signal acquired by a temperature sensor of the indoor unit.

Preferably, the inverter air conditioner control device based on the thermolator further includes: other interface connected with the controller, the other interface is used for connecting with a control terminal.

In addition, in order to achieve the aim, the present disclosure provides a terminal, the terminal includes an inverter air conditioner control device based on a thermolator as described above, the inverter air conditioner control device based on the thermolator is mounted on the terminal, the terminal is an air conditioner indoor unit or the inverter air conditioner outdoor unit.

In addition, in order to achieve the aim, the present disclosure provides an inverter air conditioner control system based on a thermolator, which includes the control device as described above, the inverter air conditioner control system based on the thermolator further includes: a thermolator connected with the input interface, an indoor unit connected with the thermolator, the inverter air conditioner outdoor unit connected with the outdoor unit communicating interface;

when the controller receives the shutdown control signal sent by the thermolator, the controller acquires the indoor temperature signal collected by the temperature detector through the detecting interface;

the controller sets a temperature corresponding to the indoor temperature signal as the target reference temperature which is achieved by controlling the operation frequency of the compressor of the inverter air conditioner outdoor unit when the compressor is booted up next time.

Preferably, the detecting interface is connected with the indoor unit, receives the indoor temperature signal collected by a temperature sensor of the indoor unit.

Preferably, the inverter air conditioner control system based on the thermolator further includes: the temperature detector connected with the detecting interface.

In addition, in order to achieve the aim, the present disclosure provides a control method of an inverter air conditioner control system based on a thermolator, the inverter air conditioner control system based on a thermolator includes the control system as described above, includes the following steps:

when the inverter air conditioner outdoor unit is in an operation process, receiving the shutdown control signal of the inverter air conditioner outdoor unit sent by the thermolator through the controller;

sending the shutdown control signal to the inverter air conditioner outdoor unit by the controller, for shutting down the inverter air conditioner outdoor unit, and simultaneously acquiring the indoor temperature signal, recording the temperature corresponding to the indoor temperature signal as the target reference temperature which is achieved by controlling the operation frequency of the compressor of the inverter air conditioner outdoor unit after the inverter air conditioner outdoor unit being open again.

Preferably, after the controller acquiring the indoor temperature signal, recording the temperature corresponding to the indoor temperature signal as the target reference temperature which being achieved by controlling the operation frequency of the compressor of the inverter air conditioner outdoor unit after the inverter air conditioner outdoor unit being open again, further includes:

acquiring an indoor temperature signal in real time after the controller receives a boot control signal sent by the thermolator;

controlling the compressor of the inverter air conditioner outdoor unit to work in a lower frequency by the controller, when a temperature corresponding to the indoor temperature signal in real time is close to the target reference temperature.

Preferably, the method further includes:

receiving the shutdown control signal sent by the thermolater, acquiring a current indoor temperature signal by the controller, when the inverter air conditioner outdoor unit is operated under the control of the target reference temperature;

updating the target reference temperature to the temperature corresponding to the current indoor temperature signal by the controller.

The present disclosure controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

The main solution of the exemplary embodiment of the present disclosure is that: the controller receives a shutdown control signal of the inverter air conditioner outdoor unit sent by the thermolater during the operation process of the inverter air conditioner outdoor unit; the controller sends the shutdown control signal to the inverter air conditioner outdoor unit, for shutting down the inverter air conditioner outdoor unit, and simultaneously acquires the indoor temperature signal, records a temperature corresponding to the indoor temperature signal as a target reference temperature which is achieved by controlling an operation frequency of a compressor of the inverter air conditioner outdoor unit after the inverter air conditioner outdoor unit is open again. The operation of the inverter air conditioner is controlled based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

As the proposal of the existing proposal of the air conditioner controlled by the thermolator can only control the fixed frequency unit, which causes the application of the air conditioner is limited, and causes a problem of that the intelligent degree of the air conditioner control process is bad.

Figure 1:
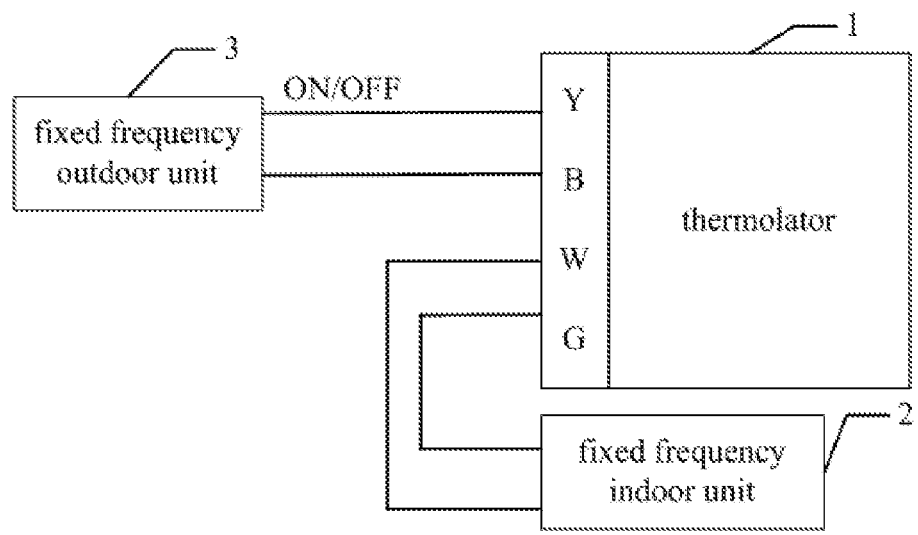
FIG. 1 is an architecture diagram of the existed air conditioner based on control of the thermolator.
Figure 2:
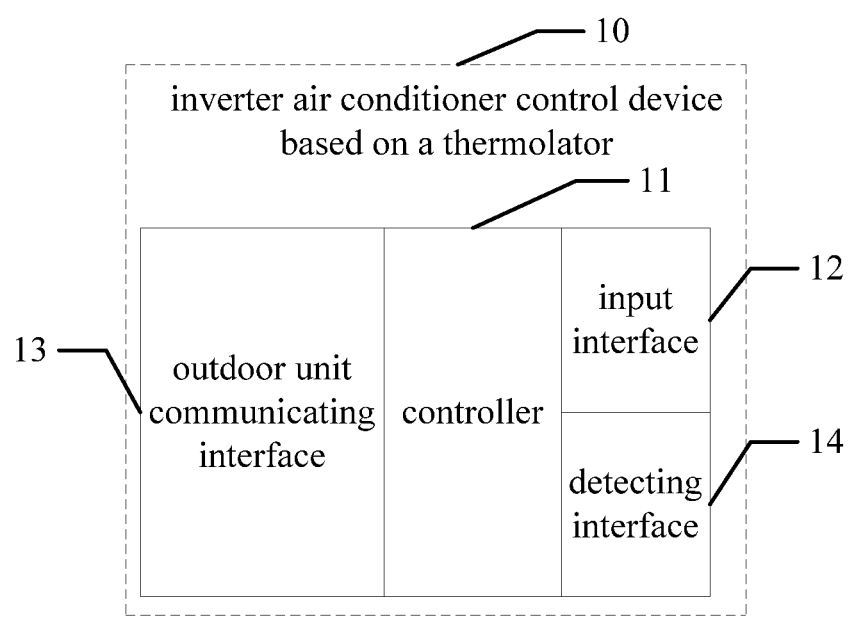
FIG. 2 is an architecture diagram of the inverter air conditioner control device based on the thermolator provided by an exemplary embodiment of the present disclosure.

Based on the above problem, the present disclosure provides an inverter air conditioner control device based on a thermolator. Referring to FIG. 2, the inverter air conditioner control device based on the thermolator includes: a controller 11, an input interface 12, an outdoor unit communicating interface 13 and a detecting interface 14 all connected with the controller 11, wherein, the input interface 12 is connected with the thermolator, receives a control signal sent by the thermolator; the detecting interface 14 is connected with a temperature detector, receives an indoor temperature signal acquired by the temperature detector; the controller 11 controls an operation of an inverter air conditioner outdoor unit by connecting with the inverter air conditioner outdoor unit through the outdoor unit communicating interface 13; the controller 11 sets a target reference temperature which is used for adjusting an operation frequency of a compressor of the inverter air conditioner outdoor unit according to a shutdown control signal of the thermolater and the indoor temperature signal acquired by the temperature detector.

In the exemplary embodiment, the controller 11 is a control chip, which has a capability of storing and calculating (data processing). The input interface 12 can be a wired connecting interface or a wireless connecting interface, the wireless connecting includes, but not limited to, bluetooth, WiFi, infrared or NFC, and so on. The controller 11 receives the control signal sent by the termolator through the input interface 12, the control signal includes a boot control signal or a shutdown control signal of the inverter air conditioner outdoor unit. A connecting between the detecting interface 14 and the temperature detector can be wired connecting or wireless connecting. The temperature detector can be a temperature sensor, which is used for detecting an indoor temperature of the indoor environment under the control of the air conditioner. The controller 11 receives the control signal sent by the thermolator, and controls the inverter air conditioner outdoor unit to work through the outdoor unit communicating interface 13, a connecting between the inverter air conditioner outdoor unit and the outdoor unit communicating interface 13 includes, but not limited to, wired connecting or wireless connecting. During the operation process of the inverter air conditioner outdoor unit, the controller 11 receives the shutdown control signal of the inverter air conditioner outdoor unit sent by the thermolator. After the controller 11 receives the control signal sent by the thermolator, the controlling of the controller 11 to the inverter air conditioner outdoor unit includes, but not limited to, controlling a compressor, an outdoor fan, a four-way valve of the inverter air conditioner outdoor unit to work, wherein, the switch of the four-way valve can be a choice of cooling/heating mode.

When the control signal is the boot control signal, after the controller 11 receives the boot control signal of the inverter air conditioner outdoor unit sent by the thermolator through the input interface 12, the controller 11 controls the inverter air conditioner outdoor unit to be booted up through the outdoor unit communicating interface 13 and controls the temperature detector connected with the detecting interface 14 to detect the indoor temperature of the indoor environment under the control of the air conditioner. When the controller 11 controls the inverter air conditioner outdoor unit to be booted up at the first time, the control rule of the controller 11 is that: after the controller 11 receives the first boot control signal sent by the thermolator, the controller 11 controls the compressor of the inverter air conditioner outdoor unit to work at a preset high frequency, the preset frequency is normally close to a highest frequency which the compressor can run on (a default frequency or a frequency subsequently set).

When the control signal is the shutdown control signal, after the controller 11 receives the shutdown control signal of the inverter air conditioner outdoor unit sent by the thermolator through the input interface 12, the controller 11 sends the shutdown control signal to the inverter air conditioner outdoor unit through the outdoor unit communicating interface 13, for controlling the inverter air conditioner outdoor unit to shut down, and recording the current indoor temperature signal received through the detecting interface 14, and a temperature corresponding to the record indoor temperature signal is set as a target reference temperature which is used for adjusting an operation frequency of a compressor of the inverter air conditioner outdoor unit, that is, when the inverter air conditioner outdoor unit is controlled to be booted up again, the operation of the compressor of the inverter air conditioner outdoor unit can be controlled according to the target reference temperature. The operation process of the inverter air conditioner outdoor unit controlled by the controller 11 includes: after the controller 11 receives the boot control signal sent by the thermolator, the controller 11 acquires an indoor temperature signal in real time; when a temperature corresponding to the indoor temperature signal in real time is close to the target reference temperature, the controller 11 controls the compressor of the inverter air conditioner outdoor unit to work in a lower frequency. The above operation process of the inverter air conditioner outdoor unit controlled by the target reference temperature can be a situation that the controller 11 does not in a first time to control the inverter air conditioner outdoor unit to work.

A process of judging the temperature corresponding to the indoor temperature signal in real time closing to the target reference temperature is that: a temperature threshold is set in advance, such as, 24° C. or 26° C., and so on. When the temperature corresponding to the indoor temperature signal in real time reaches the set temperature threshold, it is judged that the temperature corresponding to the indoor temperature signal in real time is close to the target reference temperature. When the temperature corresponding to the indoor temperature signal in real time is close to the target reference temperature, the inverter air conditioner outdoor unit is controlled to work in a lower frequency.

After the controller 11 records the target reference temperature, the control rule of the frequency operation is that: in the refrigeration mode, when the controller 11 receives the boot control signal sent by the thermolator, the controller 11 controls the inverter air conditioner outdoor unit to boot up, and acquires the current indoor temperature, an initial frequency of the operation of the compressor can be confirmed according to difference value between the current indoor temperature and the target reference temperature, if the difference value is larger, and the initial frequency is higher, for outputting larger refrigerating capacity to reduce the indoor temperature rapidly; when the indoor temperature drops to close to the target reference temperature, the compressor is controlled to operate at a lower frequency, the close to can be define as that the difference value T which can be a value range closing to 0, such as $0 \leq T \leq 1°$ C. (T can be set according to actual requirement and/or the performance of the compressor), and furthermore, the frequency of the compressor can be controlled according to the closing range between the indoor temperature and the target reference temperature in the value range, if the difference value is smaller, and the operation frequency is lower until drops to a lowest frequency at which the compressor can operate, for ensuring that the indoor temperature is close to the target reference temperature, the comfort effect can be reached.

Such as, for the refrigeration mode, when the difference value between the indoor temperature and the target reference temperature is smaller, the indoor temperature is much more close to the target reference temperature, the compressor is controlled to operate at a lower frequency, such as the current target reference temperature is 24° C., if the indoor temperature drops from 30° C. to 25° C., if the indoor temperature is detected to drop sequentially, and much more close to 24° C., the compressor is controlled to operate at a lower frequency, finally when the indoor temperature is 24° C., the compressor is controlled to operate at a preset low frequency, so that the indoor temperature is gently maintain at a value waving around the target reference temperature (such as, the difference value between the indoor temperature and the target reference temperature is 0.1° C. or 0.2° C., and so on), so that the difference value between the indoor temperature and the target reference temperature would not fluctuate too much, for improving the comfortableness of the air conditioner.

In an exemplary embodiment of the present disclosure, under the heating mode or other mode of the air conditioner, the process of the frequency operation of the compressor of the inverter air conditioner should be controlled to be similar to the above process, the ordinary skill in the art can get the frequency operation process under the heating mode and other modes according to the above frequency operation process, no need to repeat again.

Electively, the operation process of the inverter air conditioner controlled by the thermolator according to the exemplary embodiment of the present disclosure can be described from the following scenes.

Scene one:
during the process of that adding the inverter air conditioner control device based on the thermolator 10 into the control device of the thermolator at the first time, after the controller 11 receives the boot control signal of the inverter air conditioner outdoor unit inputted through the input interface 12, the controller 11 controls the inverter air conditioner outdoor unit to be booted up through the outdoor unit communicating interface 13, and controls the temperature detector to detect the indoor environment temperature through the detecting interface 14. The control rule of that the controller 11 controls the inverter air conditioner outdoor unit to be booted up at the first time is that: after the controller 11 receives the first boot control signal sent by the thermolator, the controller 11 controls the compressor of the air conditioner outdoor unit to work at a preset high frequency, the preset frequency is normally close to a highest frequency which the compressor can run on (a default frequency or a frequency subsequently set). After the inverter air conditioner outdoor unit is controlled to be booted up, the controller 11 receives the shutdown control signal of the inverter air conditioner outdoor unit sent by the thermolator through the input interface 12, after receiving the shutdown control signal, the controller 11 controls the inverter air conditioner outdoor unit to shut down through the outdoor unit communicating interface 13, and receives the indoor environment temperature signal detected by the temperature detector through the detecting interface 14, the controller 11 sets the temperature corresponding to the indoor temperature signal as the target reference temperature which is used for adjusting a next operation frequency of the compressor of the inverter air conditioner outdoor unit, that is, when the inverter air conditioner outdoor unit is controlled to be booted up again, the operation of the compressor of the inverter air conditioner outdoor unit can be controlled according to the target reference temperature.

Scene two:
the controller 11 receives the boot control signal of the inverter air conditioner outdoor unit sent by the thermolator through the input interface 12; after the controller 11 receives the boot control signal, the controller 11 acquires the set target reference temperature; the controller 11 generates a compressor control signal corresponding to the target reference temperature, sends the compressor control signal to the inverter air conditioner outdoor unit through the outdoor unit communicating interface 13, for controlling the operation of the inverter air conditioner outdoor unit through the compressor control signal, that is, controlling the operation of the inverter air conditioner outdoor unit based on the target reference temperature is executed.

Scene three:
during the process of that the compressor of the inverter air conditioner outdoor unit is operated under the control of the target reference temperature, when the controller 11 receives the shutdown control signal sent by the thermolator through the input interface 12, the controller 11 acquires the current indoor temperature through the detecting interface 14, and updates the target reference temperature to the temperature corresponding to the current indoor temperature signal, when the inverter air conditioner outdoor unit is controlled to be booted up again, the operation of the compressor of the inverter air conditioner outdoor unit is controller through the updated target reference temperature.

The exemplary embodiment controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

Figure 3:
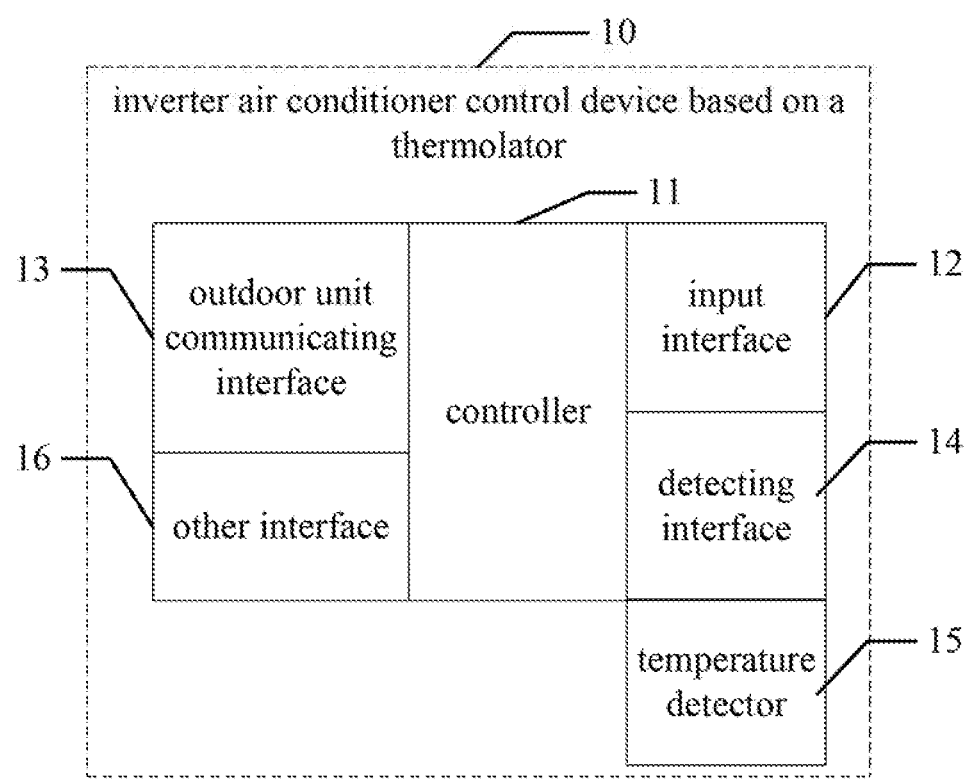
FIG. 3 is an architecture diagram of the inverter air conditioner control device based on the thermolator provided by another exemplary embodiment of the present disclosure.

Furthermore, referring to FIG. 3, the inverter air conditioner control device based on the thermolator 10 further includes: the temperature detector 15 connected with the detecting interface 14. That is, the temperature detector 15 can be a part of the control device.

In an exemplary embodiment, the inverter air conditioner control device based on the thermolator 10 also adapts to the scene which does not include the temperature detector 15, the temperature detecting method in the detail scene is that: the temperature detector 15 is installed on the thermolator, the temperature detector 15 is connected with the detecting interface 14 through the wired connecting mean or the wireless connecting mean, the controller 11 reads the indoor temperature detected by the temperature detector 15 by the detecting interface 14 through the wired connecting mean or the wireless connecting mean. The configuration of the control device can be much more flexible and diverse through setting the temperature detector as a part of or an external part of the inverter air conditioner control device based on the thermolator 10.

Furthermore, the detecting interface 14 is connected with the indoor unit, and receives the indoor temperature signal acquired by the thermolator of the indoor unit. The indoor unit has a temperature detector, the detecting interface 14 is connected with the indoor unit, preferably connected with the controller of the indoor unit, the controller 11 detects the indoor environment temperature through the indoor unit, acquires the indoor temperature through the detecting interface 14 based on the controller of the indoor unit. The present disclosure provides diverse temperature acquiring methods by connecting the indoor unit with the detecting interface 14, and no need to add additional device to acquire the indoor temperature, the cost is saved.

In an exemplary embodiment, the inverter air conditioner control device based on the thermolator 10 further includes other interface 15, the other interface 15 is connected with the controller 11, the other interface 15 can be used for connecting with the control terminal, the connecting mean can be wired connecting mean or wireless connecting mean, the control terminal includes, but not limited to, a remote-control unit, a phone, a pad or a PC, and so on. The control terminal sends control signal to the inverter air conditioner control device based on the thermolator 10 based on the other interface 15, for controlling the control device to adjust the operation parameter of the inverter air conditioner outdoor unit. The controller 11 can also include a communicating interface, the controller 11 can be connected with the control terminal through the communicating interface, the control terminal acts as the processing center, can deal with the data of the input interface 12, outdoor unit communicating interface 13 and the detecting interface 14 through connecting with the controller 11, and send the control signal to control the operation of the inverter air conditioner outdoor unit through the controller 11. The controlling of the inverter air conditioner outdoor unit is flexible and diverse through setting the external control terminal. While the control priority of the thermolator is highest by adding the control of the control terminal In another exemplary embodiment, the thermolator also includes a communicating interface, which can be used for receiving the boot/shutdown control signal of the external terminal remotely or in near field, to control the switch of the inverter air conditioner outdoor unit through the thermolator and control device, the thermolator and control device is connected with the communicating interface.

Furthermore, the present disclosure also provides a terminal, the terminal includes the inverter air conditioner control device based on the thermolator 10 as described above, the control device 10 is installed on the terminal. The terminal include, but not limited to, inverter air conditioner outdoor unit or air conditioner indoor unit. Taking the inverter air conditioner outdoor unit as an example, the controller 11 installed on the inverter air conditioner control device based on the thermolator 10 controls the compressor of the inverter air conditioner outdoor unit based on the acquired indoor temperature signal by receiving the control signal sent by the thermolator, controlling the switch of the inverter air conditioner outdoor unit by the outdoor communicating interface 13, and acquiring the indoor temperature signal by the temperature detector connected with the detecting interface.

The exemplary embodiment controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

Figure 4:
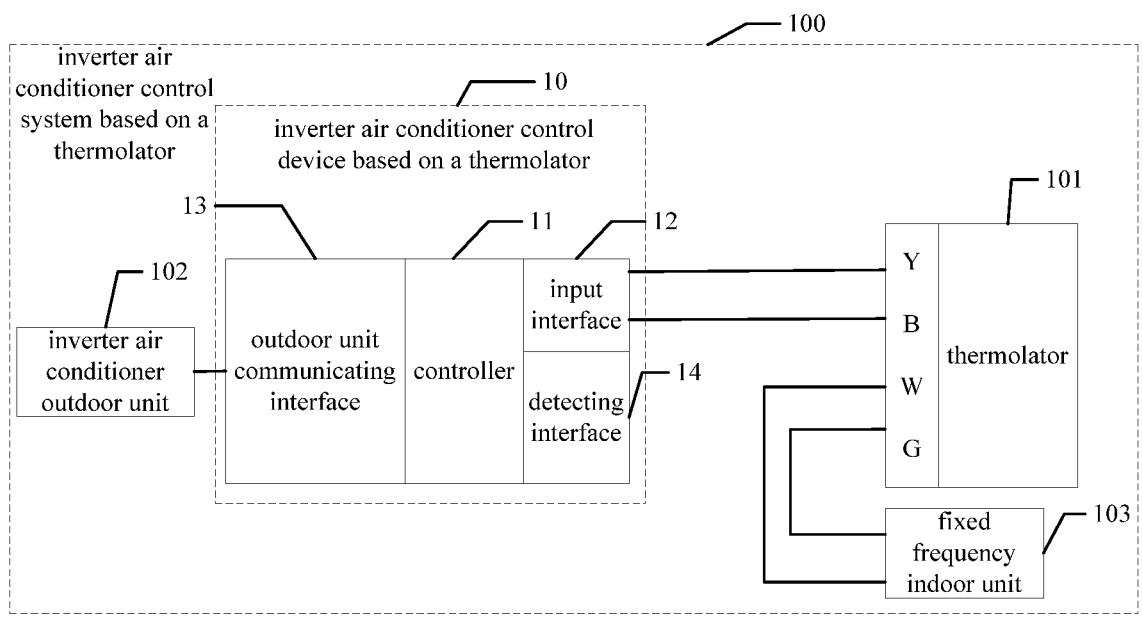
FIG. 4 is an architecture diagram of the inverter air conditioner control system based on the thermolator provided by an exemplary embodiment of the present disclosure.

Electively, the present disclosure provides an inverter air conditioner control system 100 based on the thermolator. Referring to FIG. 4, the inverter air conditioner control system 100 based on the thermolator includes the inverter air conditioner control device based on the thermolator 10 as described above, the inverter air conditioner control system 100 based on the thermolator further includes: a thermolator 101 connected with the input interface 12, an inverter air conditioner outdoor unit 102 connected with the outdoor unit communicating interface 13, and an indoor unit 103 connected with the thermolator 101 (as the indoor unit does not have control relationship with the inverter air conditioner control device based on the thermolator 10, the control relationship of the indoor unit is the same with the existed control relationship based on the thermolator 101, no need to repeat again); wherein, when the controller 11 receives the shutdown control signal sent by the thermolator 101, the controller 11 acquires the indoor temperature signal through the detecting interface 14;

the controller 11 sets a temperature corresponding to the indoor temperature signal as a target reference temperature, which is achieved by controlling the operation frequency of the compressor of the inverter air conditioner outdoor unit 102 when the compressor is booted up again.

In the exemplary embodiment, the controller 11 is a control chip, which has a capability of storing and calculating (data processing). The input interface 12 can be a wired connecting interface or a wireless connecting interface, the wireless connecting includes, but not limited to, bluetooth, WiFi, infrared or NFC, and so on. The controller 11 receives the control signal sent by the termolator 101 through the input interface 12, the control signal includes a boot control signal or a shutdown control signal of the inverter air conditioner outdoor unit 102. A connecting between the detecting interface 14 and the temperature detector can be wired connecting or wireless connecting. The temperature detector can be a temperature sensor, which is used for detecting an indoor temperature of the indoor environment under the control of the air conditioner. The controller 11 receives the control signal sent by the thermolator 101, and controls the inverter air conditioner outdoor unit 102 to work through the outdoor unit communicating interface 13, a connecting between the inverter air conditioner outdoor unit 102 and the outdoor unit communicating interface 13 includes, but not limited to, wired connecting or wireless connecting. During the operation process of the inverter air conditioner outdoor unit, the controller 11 receives the shutdown control signal of the inverter air conditioner outdoor unit sent by the thermolator. After the controller 11 receives the control signal sent by the thermolator, the controlling of the controller 11 to the inverter air conditioner outdoor unit includes, but not limited to, controlling a compressor, an outdoor fan, a four-way valve of the inverter air conditioner outdoor unit to work, wherein, the switch of the four-way valve can be a choice of cooling/heating mode.

When the control signal is the boot control signal, after the controller 11 receives the boot control signal of the inverter air conditioner outdoor unit 102 sent by the thermolator 101 through the input interface 12, the controller 11 controls the inverter air conditioner outdoor unit 102 to be booted up through the outdoor unit communicating interface 13 and controls the temperature detector connected with the detecting interface 14 to detect the indoor temperature of the indoor environment under the control of the air conditioner. The control rule of that the controller 11 controls the inverter air conditioner outdoor unit 103 to be booted up at the first time is that: after the controller 11 receives the first boot control signal sent by the thermolator 101, the controller 11 controls the compressor of the inverter air conditioner outdoor unit 103 to work at a preset high frequency, the preset frequency is normally close to a highest frequency which the compressor can run on (a default frequency or a frequency subsequently set).

When the control signal is the shutdown control signal, after the controller 11 receives the shutdown control signal of the inverter air conditioner outdoor unit 102 sent by the thermolator 101 through the input interface 12, the controller 11 sends the shutdown control signal to the inverter air conditioner outdoor unit 102 through the outdoor unit communicating interface 13, for controlling the inverter air conditioner outdoor unit 102 to shut down, and recording the current indoor temperature signal received through the detecting interface 14, and setting a temperature corresponding to the record indoor temperature signal as the target reference temperature which is used for adjusting an operation frequency of a compressor of the inverter air conditioner outdoor unit 102, that is, when the inverter air conditioner outdoor unit 102 is controlled to be booted up again, the operation of the compressor of the inverter air conditioner outdoor unit 102 can be controlled according to the target reference temperature. The operation process of the inverter air conditioner outdoor unit 102 controlled by the controller 11 includes: after the controller 11 receives the boot control signal sent by the thermolator 101, the controller 11 acquires an indoor temperature signal in real time; when a temperature corresponding to the indoor temperature signal in real time is close to the target reference temperature, the controller 11 controls the compressor of the inverter air conditioner outdoor unit 102 to work in a lower frequency. The above operation process of the inverter air conditioner outdoor unit controlled by the target reference temperature can be a situation that the controller 11 does not in a first time to control the inverter air conditioner outdoor unit to work.

It is to be understood that, a process of judging the temperature corresponding to the indoor temperature signal in real time closing to the target reference temperature is that: a temperature threshold is set in advance, such as, 24° C. or 26° C., and so on. When the temperature corresponding to the indoor temperature signal in real time reaches the set temperature threshold, it is judged that the temperature corresponding to the indoor temperature signal in real time is close to the target reference temperature. When the temperature corresponding to the indoor temperature signal in real time is close to the target reference temperature, the inverter air conditioner outdoor unit is controlled to work in a lower frequency.

After the controller 11 records the target reference temperature, the control rule of the frequency operation is that: in the refrigeration mode, when the controller 11 receives the boot control signal sent by the thermolator, the controller 11 controls the inverter air conditioner outdoor unit to boot up, and acquires the current indoor temperature, an initial frequency of the operation of the compressor can be confirmed according to a difference value between the current indoor temperature and the target reference temperature, if the difference value is larger, and the initial frequency is higher, for outputting larger refrigerating capacity to reduce the indoor temperature rapidly; when the indoor temperature drops to close to the target reference temperature, the compressor is controlled to operate at a lower frequency, the close to can be define as that the difference value T which can be a value range closing to 0, such as $0 \leq T \leq 1°$ C. (T can be set according to actual requirement and/or the performance of the compressor), and furthermore, the frequency of the compressor can be controlled according to the closing range between the indoor temperature and the target reference temperature in the value range, if the difference value is smaller, and the operation frequency is lower until drops to a lowest frequency at which the compressor can operate, for ensuring that the indoor temperature is close to the target reference temperature, the comfort effect can be reached. Such as, for the refrigeration mode, when the difference value between the indoor temperature and the target reference temperature is smaller, the indoor temperature is much more close to the target reference temperature, the compressor is controlled to operate at a lower frequency, such as the current target reference temperature is 24° C., if the indoor temperature drops from 30° C. to 25° C., if the indoor temperature is detected to drop sequentially, and much more close to 24° C., the compressor is controlled to operate at a lower frequency, finally when the indoor temperature is 24° C., the compressor is controlled to operate at a preset low frequency, so that the indoor temperature is gently maintain at a value waving around the target reference temperature (such as, the difference value between the indoor temperature and the target reference temperature is 0.1° C. or 0.2° C., and so on), so that the difference value between the indoor temperature and the target reference temperature would not fluctuate too much, for improving the comfortableness of the air conditioner.

In an exemplary embodiment of the present disclosure, under the heating mode or other mode of the air conditioner, the process of the frequency operation of the compressor of the inverter air conditioner 103 should be controlled to be similar to the above process, the ordinary skill in the art can get the frequency operation process under the heating mode and other modes according to the above frequency operation process, no need to repeat again.

Electively, the operation process of the inverter air conditioner controlled by the thermolator according to the exemplary embodiment of the present disclosure can be described from the following scenes.

Scene one:

During the process of that adding the inverter air conditioner control device based on the thermolator 10 into the control device of the thermolator 101 at the first time, after the controller 11 receives the boot control signal of the inverter air conditioner outdoor unit inputted through the input interface 12, the controller 11 controls the inverter air conditioner outdoor unit 102 to be booted up through the outdoor unit communicating interface 13, and controls the temperature detector to detect the indoor environment temperature through the detecting interface 14. The control rule of that the controller 11 controls the inverter air conditioner outdoor unit to be booted up at the first time is that: after the controller 11 receives the first boot control signal sent by the thermolator, the controller 11 controls the compressor of the air conditioner outdoor unit to work at a preset high frequency, the preset frequency is normally close to a highest frequency which the compressor can run on (a default frequency or a frequency subsequently set). After the inverter air conditioner outdoor unit is controlled to be booted up, the controller 11 receives the shutdown control signal of the inverter air conditioner outdoor unit sent by the thermolator through the input interface 12, after receiving the shutdown control signal, the controller 11 controls the inverter air conditioner outdoor unit 102 to shut down through the outdoor unit communicating interface 13, and receives the indoor environment temperature signal detected by the temperature detector through the detecting interface 14, the controller 11 sets the temperature corresponding to the indoor temperature signal as the target reference temperature which is used for adjusting a next operation frequency of the compressor of the inverter air conditioner outdoor unit 102, that is, when the inverter air conditioner outdoor unit 102 is controlled to be booted up again, the operation of the compressor of the inverter air conditioner outdoor unit 102 can be controlled according to the target reference temperature.

Scene two:

the controller 11 receives the boot control signal of the inverter air conditioner outdoor unit 102 sent by the thermolator 101 through the input interface 12; after the controller 11 receives the boot control signal, the controller 11 acquires the set target reference temperature; the controller 11 generates a compressor control signal corresponding to the target reference temperature, sends the compressor control signal to the inverter air conditioner outdoor unit 102 through the outdoor unit communicating interface 13, for controlling the operation of the inverter air conditioner outdoor unit 102 through the compressor control signal, that is, controlling the operation of the inverter air conditioner outdoor unit 102 based on the target reference temperature is executed.

Scene three:

During the process of that the compressor of the inverter air conditioner outdoor unit 102 is operated under the control of the target reference temperature, when the controller 11 receives the shut down control signal sent by the thermolator 101 through the input interface 12, the controller 11 acquires the current indoor temperature through the detecting interface 14, and updates the target reference temperature to the temperature corresponding to the current indoor temperature signal, when the inverter air conditioner outdoor unit 102 is controlled to be booted up again, the operation of the compressor of the inverter air conditioner outdoor unit 102 is controller through the updated target reference temperature.

The exemplary embodiment controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

Figure 5:
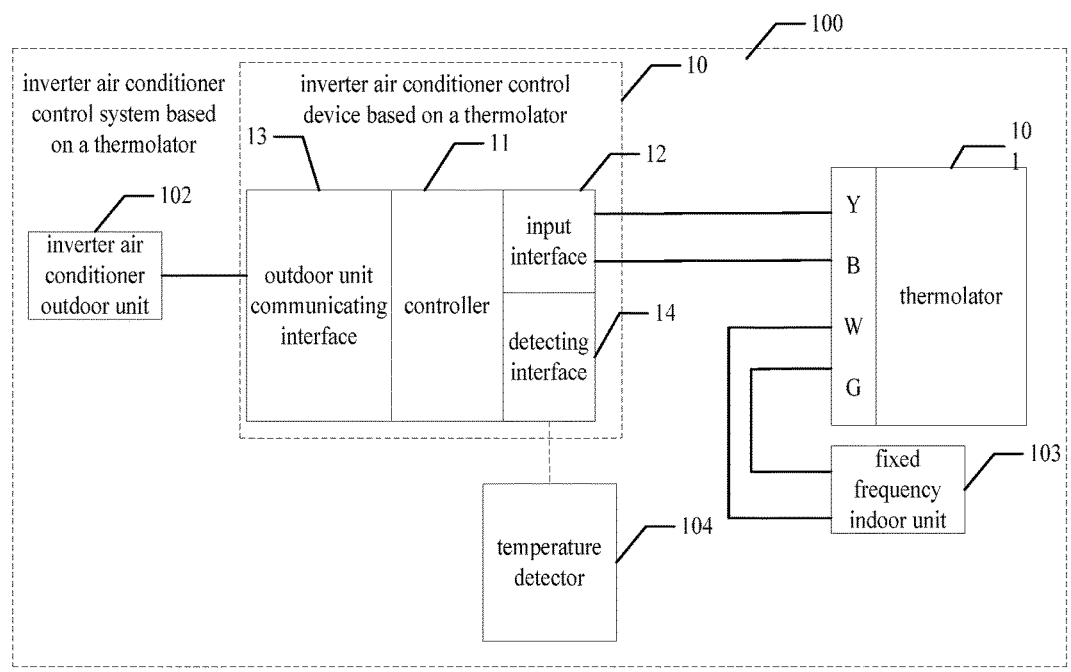
FIG. 5 is an architecture diagram of the inverter air conditioner control system based on the thermolator provided by another exemplary embodiment of the present disclosure.

Furthermore, referring to FIG. 5, the inverter air conditioner control system 100 based on the thermolator further includes: the temperature detector 104 connected with the detecting interface 14. That is, the temperature detector 104 can be a part of the control system.

In an exemplary embodiment, the inverter air conditioner control system 100 based on the thermolator also adapts to the scene which does not include the temperature detector 104, the temperature detecting method in the detail scene is that: the temperature detector 104 is installed on the thermolator 101, the temperature detector 104 is connected with the detecting interface 14 through the wired connecting mean or the wireless connecting mean, the controller 11 reads the detected indoor temperature detected by the temperature detector 104 by the detecting interface 14 through the wired connecting mean or the wireless connecting mean. The configuration of the control device can be much more flexible and diverse through setting the temperature detector as a part of or external part of the inverter air conditioner control system 100 based on the thermolator.

Furthermore, the detecting interface 14 is connected with the indoor unit, and receives the indoor temperature signal acquired by the thermolator of the indoor unit. The indoor unit has a temperature detector, the detecting interface 14 is connected with the indoor unit, preferably connected with the controller of the indoor unit, the controller 11 detects the indoor environment temperature through the indoor unit, acquires the indoor temperature through the detecting interface 14 based on the controller of the indoor unit. The present disclosure provides diverse temperature acquiring methods by connecting the indoor unit with the detecting interface 14, and no need to add additional device to acquire the indoor temperature, the cost is saved.

In an exemplary embodiment, the control system further includes other interface, the other interface is connected with the controller 11, the other interface can be used for connecting with the control terminal, the connecting mean can be wired connecting mean or wireless connecting mean, the control terminal includes, but not limited to, a remote-control unit, a phone, a pad or a PC, and so on. The control terminal sends control signal to the control device based on the other interface, for controlling the control device to adjust the operation parameter of the inverter air conditioner outdoor unit 102. The controller 11 can also include a communicating interface, the controller 11 can be connected with the control terminal through the communicating interface, the control terminal acts as the processing center, can deal with the data of the input interface 12, outdoor unit communicating interface 13 and the detecting interface 14 through connecting with the controller 11, and send the control signal to control the operation of the inverter air conditioner outdoor unit 102 through the controller 11. The controlling of the inverter air conditioner outdoor unit 102 is flexible and diverse through setting the external control terminal. While the control priority of the thermolator 101 is highest by adding the control of the control terminal. In another exemplary embodiment, the thermolator 101 also includes a communicating interface, which can be used for receiving the boot/shutdown control signal of the external terminal remotely or in near field, to control the switch of the inverter air conditioner outdoor unit 102 through the thermolator 101 and control device, the thermolator 101 and control device is connected with the communicating interface.

Furthermore, the inverter air conditioner control system based on the thermolator includes a terminal, the terminal includes the inverter air conditioner control device based on the thermolator 10 as described above, the control device 10 is installed on the terminal. The terminal include, but not limited to, inverter air conditioner outdoor unit or air conditioner indoor unit. Taking the inverter air conditioner outdoor unit as an example, the controller 11 installed on the inverter air conditioner control device based on the thermolator 10 controls the compressor of the inverter air conditioner outdoor unit based on the acquired indoor temperature signal by receiving the control signal sent by the thermolator, controlling the switch of the inverter air conditioner outdoor unit by the outdoor communicating interface 13, and acquiring the indoor temperature signal by the temperature detector connected with the detecting interface.

The exemplary embodiment controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

Figure 6:
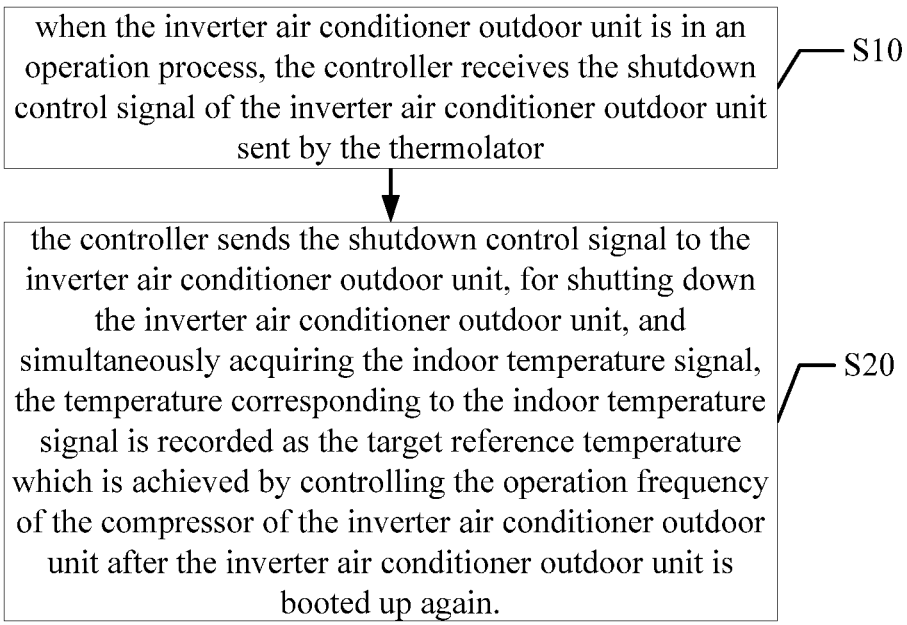
FIG. 6 is a flow diagram of the inverter air conditioner control method based on the thermolator provided by a first exemplary embodiment of the present disclosure.

The present disclosure provides an inverter air conditioner control method based on a thermolator. Referring to FIG. 6, the inverter air conditioner control system based on the thermolator includes the control method, includes the following steps:

at step S10, when the inverter air conditioner outdoor unit is in an operation process, the controller receives the shutdown control signal of the inverter air conditioner outdoor unit sent by the thermolator;

at step S20, the controller sends the shutdown control signal to the inverter air conditioner outdoor unit, for shutting down the inverter air conditioner outdoor unit, and simultaneously acquiring the indoor temperature signal, the temperature corresponding to the indoor temperature signal is recorded as the target reference temperature which is achieved by controlling the operation frequency of the compressor of the inverter air conditioner outdoor unit after the inverter air conditioner outdoor unit is booted up again.

In the exemplary embodiment, during the control of the inverter air conditioner based on the thermolator, the controller is a control chip, which has a capability of storing and calculating (data processing). The input interface can be a wired connecting interface or a wireless connecting interface, the wireless connecting includes, but not limited to, bluetooth, WiFi, infrared or NFC, and so on. The controller receives the control signal sent by the thermolator through the input interface, the control signal includes a boot control signal or a shutdown control signal of the inverter air conditioner outdoor unit. A connecting between the detecting interface and the temperature detector can be wired connecting or wireless connecting. The temperature detector can be a temperature sensor, which is used for detecting an indoor temperature of the indoor environment under the control of the air conditioner. The controller receives the control signal sent by the thermolator, and controls the inverter air conditioner outdoor unit to work through the outdoor unit communicating interface, a connecting between the inverter air conditioner outdoor unit and the outdoor unit communicating interface includes, but not limited to, wired connecting or wireless connecting.

During the operation process of the inverter air conditioner outdoor unit, the controller receives the shutdown control signal of the inverter air conditioner outdoor unit sent by the thermolator. After the controller receives the control signal sent by the thermolator, the controlling of the controller to the inverter air conditioner outdoor unit includes, but not limited to, controlling a compressor, an outdoor fan, a four-way valve of the inverter air conditioner outdoor unit to work, wherein, the switch of the four-way valve can be a choice of cooling/heating mode.

When the control signal is the boot control signal, after the controller receives the boot control signal of the inverter air conditioner outdoor unit sent by the thermolator through the input interface, the controller controls the inverter air conditioner outdoor unit to be booted up through the outdoor unit communicating interface and controls the temperature detector connected with the detecting interface to detect the indoor temperature of the indoor environment under the control of the air conditioner. When the controller controls the inverter air conditioner outdoor unit to be booted up at the first time, the control rule of the controller is that: after the controller receives the first boot control signal sent by the thermolator, the controller controls the compressor of the inverter air conditioner outdoor unit to work at a preset high frequency, the preset frequency is normally close to a highest frequency which the compressor can run on (a default frequency or a frequency subsequently set).

When the control signal is the shutdown control signal, after the controller receives the shutdown control signal of the inverter air conditioner outdoor unit sent by the thermolator through the input interface, the controller sends the shutdown control signal to the inverter air conditioner outdoor unit through the outdoor unit communicating interface, for controlling the inverter air conditioner outdoor unit to shut down, and simultaneously recording the current indoor temperature signal received by the detecting interface, and a temperature corresponding to the record indoor temperature signal is set as a target reference temperature which is used for adjusting an operation frequency of a compressor of the inverter air conditioner outdoor unit, that is, when the inverter air conditioner outdoor unit is controlled to be booted up again, the operation of the compressor of the inverter air conditioner outdoor unit can be controlled according to the target reference temperature. The above operation process of the inverter air conditioner outdoor unit controlled by the target reference temperature can be a situation that the controller 11 does not in a first time to control the inverter air conditioner outdoor unit to work.

Electively, the operation process of the inverter air conditioner controlled by the thermolator according to the exemplary embodiment of the present disclosure can be described from the following scenes.

Scene one:

during the process of that adding the inverter air conditioner control device based on the thermolator 10 into the control device of the thermolator at the first time, after the controller receives the boot control signal of the inverter air conditioner outdoor unit inputted through the input interface, the controller controls the inverter air conditioner outdoor unit to be booted up through the outdoor unit communicating interface, and controls the temperature detector to detect the indoor environment temperature through the detecting interface. The control rule of that the controller 11 controls the inverter air conditioner outdoor unit to be booted up at the first time is that: after the controller receives the first boot control signal sent by the thermolator, the controller controls the compressor of the air conditioner outdoor unit to work at a preset high frequency, the preset frequency is normally close to a highest frequency which the compressor can run on (a default frequency or a frequency subsequently set). After the inverter air conditioner outdoor unit is controlled to be booted up, the controller 11 receives the shutdown control signal of the inverter air conditioner outdoor unit sent by the thermolator through the input interface 12, after receiving the shutdown control signal, the controller 11 controls the inverter air conditioner outdoor unit to shut down through the outdoor unit communicating interface, and receives the indoor environment temperature signal detected by the temperature detector through the detecting interface, the controller 11 sets the temperature corresponding to the indoor temperature signal as the target reference temperature which is used for adjusting a next operation frequency of the compressor of the inverter air conditioner outdoor unit, that is, when the inverter air conditioner outdoor unit is controlled to be booted up again, the operation of the compressor of the inverter air conditioner outdoor unit can be controlled according to the target reference temperature.

Scene two:

the controller receives the boot control signal of the inverter air conditioner outdoor unit sent by the thermolator through the input interface; after the controller receives the boot control signal, the controller acquires the set target reference temperature; the controller generates a compressor control signal corresponding to the target reference temperature, sends the compressor control signal to the inverter air conditioner outdoor unit through the outdoor unit communicating interface, for controlling the operation of the inverter air conditioner outdoor unit through the compressor control signal, that is, controlling the operation of the inverter air conditioner outdoor unit based on the target reference temperature is executed.

Scene three:

during the process of that the compressor of the inverter air conditioner outdoor unit is operated under the control of the target reference temperature, when the controller receives the shutdown control signal sent by the thermolator through the input interface, the controller acquires the current indoor temperature through the detecting interface, and updates the target reference temperature to the temperature corresponding to the current indoor temperature signal, when the inverter air conditioner outdoor unit is controlled to be booted up again, the operation of the compressor of the inverter air conditioner outdoor unit is controller through the updated target reference temperature.

The exemplary embodiment controls the operation of the inverter air conditioner based on the indoor temperature detected by the control device through building the inverter air conditioner control system including the thermolator and the control device, and adding one control device between the inverter air conditioner and the thermolator, adapting the inverter air conditioner by the control device, so that the controlling of the inverter air conditioner can be added into the proposal of controlling the air conditioner by the thermolator. The proposal of the inverter air conditioner controlled by the thermolator is provided, the intelligent degree of the air conditioner controlled by the thermolator is improved, and the comfortableness of the air conditioner is also improved.

Furthermore, the inverter air conditioner control system based on the thermolator further includes the temperature detector connected with the detecting interface. That is, the temperature detector can be a part of the control system.

In an exemplary embodiment, the inverter air conditioner control system based on the thermolator also adapts to the scene which does not include the temperature detector, the temperature detecting method in the detail scene is that: the temperature detector is installed on the thermolator, the temperature detector is connected with the detecting interface through the wired connecting mean or the wireless connecting mean, the controller reads the indoor temperature detected by the temperature detector by the detecting interface through the wired connecting mean or the wireless connecting mean. The configuration of the control device can be much more flexible and diverse through setting the temperature detector as a part of or an external part of the inverter air conditioner control device based on the thermolator 10.

Furthermore, the detecting interface is connected with the indoor unit, and receives the indoor temperature signal acquired by the thermolator of the indoor unit. The indoor unit has a temperature detector, the detecting interface is connected with the indoor unit, preferably connected with the controller of the indoor unit, the controller detects the indoor environment temperature through the indoor unit, acquires the indoor temperature through the detecting interface based on the controller of the indoor unit. The present disclosure provides diverse temperature acquiring methods by connecting the indoor unit with the detecting interface, and no need to add additional device to acquire the indoor temperature, the cost is saved.

In an exemplary embodiment, the control system further includes other interface, the other interface can be used for connecting with the control terminal, the connecting mean can be wired connecting mean or wireless connecting mean, the control terminal includes, but not limited to, a remote-control unit, a phone, a pad or a PC, and so on. The control terminal sends control signal to the control device based on the other interface, for controlling the control device to adjust the operation parameter of the inverter air conditioner outdoor unit. The controller can also include a communicating interface, the controller can be connected with the control terminal through the communicating interface, the control terminal acts as the processing center, can deal with the data of the input interface, the outdoor unit communicating interface and the detecting interface through connecting with the controller, and send the control signal to control the operation of the inverter air conditioner outdoor unit through the controller. The controlling of the inverter air conditioner outdoor unit is flexible and diverse through setting the external control terminal. While the control priority of the thermolator is highest by adding the control of the control terminal. In another exemplary embodiment, the thermolator also includes a communicating interface, which can be used for receiving the boot/shutdown control signal of the external terminal remotely or in near field, to control the switch of the inverter air conditioner outdoor unit through the thermolator and control device, the thermolator and control device is connected with the communicating interface.

Figure 7:
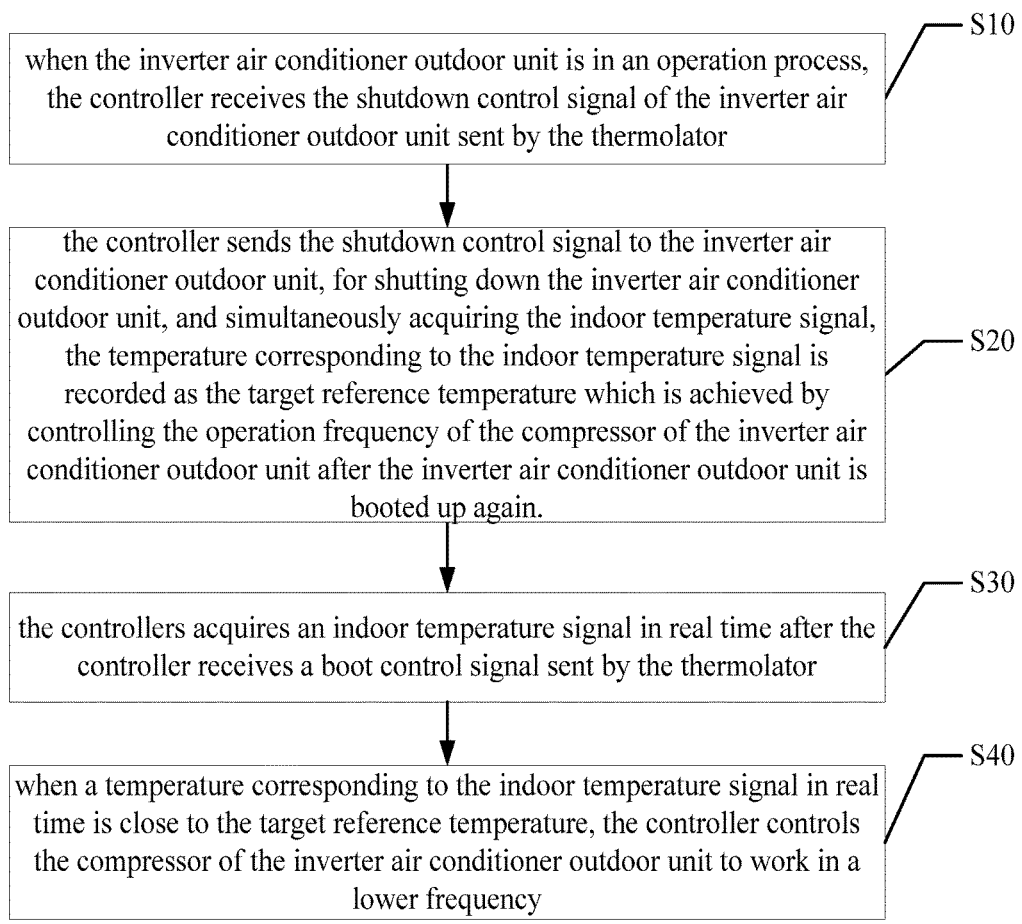
FIG. 7 is a flow diagram of the inverter air conditioner control method based on the thermolator provided by a second exemplary embodiment of the present disclosure.

Referring to FIG. 7, FIG. 7 is control method of the present disclosure according to the second exemplary embodiment, based on the first exemplary embodiment, after the step S20, the control method further includes:

At step S30, the controllers acquires an indoor temperature signal in real time after the controller receives a boot control signal sent by the thermolator;

At step S40, when a temperature corresponding to the indoor temperature signal in real time is close to the target reference temperature, the controller controls the compressor of the inverter air conditioner outdoor unit to work in a lower frequency.

In the exemplary embodiment, the inverter air conditioner outdoor unit and the control device have already been both powered on and operated, the control device has already had a target reference temperature TS1. User sets the inverter air conditioner outdoor unit to boot up in the refrigeration mode through the thermolator, at this time, if the internal of the thermolator detects that the indoor environment temperature is higher than the target reference temperature, the thermolator outputs the compressor starting signal, the inner blower fan starting signal, the four-way valve shutdown signal, after the control device detects the compressor starting signal and the four-way valve shutdown signal, the control device determines that the thermolator controls the inverter air conditioner outdoor unit to start the refrigeration mode at this time, at this time the control device controls the compressor of the inverter air conditioner outdoor unit to start and the four-way valve shutdown to through the outdoor unit communicating interface, the fixed frequency unit is also under the control of the thermolator to realize the refrigeration operation. The control rule of the frequency of the compressor is that: when the compressor starts, if the different value TS1 between the indoor environment temperature and the target reference temperature is large, the compressor starts at a higher frequency, and outputs higher refrigerating capacity, to reduce the indoor environment temperature rapidly; if the different value TS1 between the indoor environment temperature and the target reference temperature is small, the compressor starts at a lower frequency, and outputs smaller refrigerating capacity, to maintain that the indoor temperature changes slowly and improve the comfortableness.

In detail, a process of judging the temperature corresponding to the indoor temperature signal in real time closing to the target reference temperature is that: a temperature threshold is set in advance, such as, 24° C. or 26° C., and so on. When the temperature corresponding to the indoor temperature signal in real time reaches the set temperature threshold, it is judged that the temperature corresponding to the indoor temperature signal in real time is close to the target reference temperature. When the temperature corresponding to the indoor temperature signal in real time is close to the target reference temperature, the inverter air conditioner outdoor unit is controlled to work in a lower frequency.

After the controller records the target reference temperature, the control rule of the frequency operation is that: in the refrigeration mode, when the controller receives the boot control signal sent by the thermolator, the controller controls the inverter air conditioner outdoor unit to boot up, and acquires the current indoor temperature, an initial frequency of the operation of the compressor can be confirmed according to a difference value between the current indoor temperature and the target reference temperature, if the difference value is larger, and the initial frequency is higher, for outputting larger refrigerating capacity to reduce the indoor temperature rapidly; when the indoor temperature drops to close to the target reference temperature, the compressor is controlled to operate at a lower frequency, the close to can be define as that the difference value T which can be a value range closing to 0, such as $0 \le T \le 1°$ C. (T can be set according to actual requirement and/or the performance of the compressor), and furthermore, the frequency of the compressor can be controlled according to the closing range between the indoor temperature and the target reference temperature in the value range, if the difference value is smaller, and the operation frequency is lower until drops to a lowest frequency at which the compressor can operate, for ensuring that the indoor temperature is close to the target reference temperature, the comfort effect can be reached. Such as, for the refrigeration mode, when the difference value between the indoor temperature and the target reference temperature is smaller, the indoor temperature is much more close to the target reference temperature, the compressor is controlled to operate at a lower frequency, such as the current target reference temperature is 24° C., if the indoor temperature drops from 30° C. to 25° C., if the indoor temperature is detected to drop sequentially, and much more close to 24° C., the compressor is controlled to operate at a lower frequency, finally when the indoor temperature is 24° C., the compressor is controlled to operate at a preset low frequency, so that the indoor temperature is gently maintain at a value waving around the target reference temperature (such as, the difference value between the indoor temperature and the target reference temperature is 0.1° C. or 0.2° C., and so on), so that the difference value between the indoor temperature and the target reference temperature would not fluctuate too much, for improving the comfortableness of the air conditioner.

In an exemplary embodiment of the present disclosure, under the heating mode or other mode of the air conditioner, the process of that the frequency operation of the compressor of the inverter air conditioner should be controlled is similar to the above process, the ordinary skill in the art can get the frequency operation process under the heating mode and other modes according to the above frequency operation process, no need to repeat again.

Figure 8:
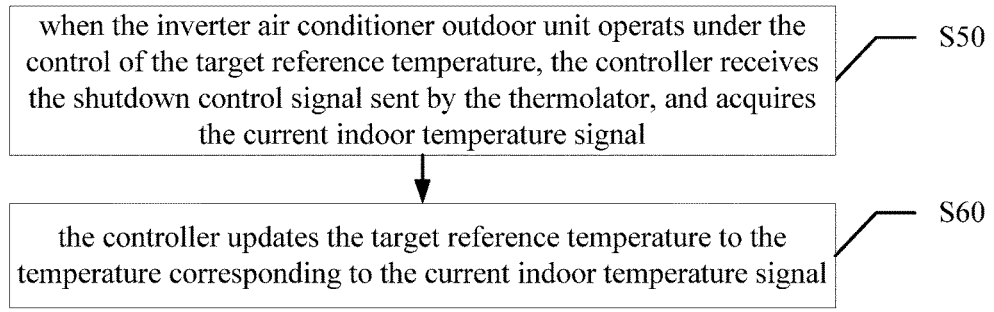
FIG. 8 is a flow diagram of the inverter air conditioner control method based on the thermolator provided by a third exemplary embodiment of the present disclosure.

Referring to FIG. 8, FIG. 8 is the third exemplary embodiment of the control method of the present disclosure, based on the second exemplary embodiment, the method further includes:

At step S50, when the inverter air conditioner outdoor unit operates under the control of the target reference temperature, the controller receives the shutdown control signal sent by the thermolator, and acquires the current indoor temperature signal;

At step S60, the controller updates the target reference temperature to the temperature corresponding to the current indoor temperature signal.

In the exemplary embodiment, during a process of that the control device controls the air conditioner to operate according to that the target reference temperature is TS1, the compressor control signal outputted by the thermolator should be always detected: if the thermolator outputs the compressor shutdown signal, and the compressor is shutdown, and the indoor temperature at this time can be recorded as a new setting temperature TSnew of the control device; if the thermolator does not output the compressor shutdown signal, even if the indoor temperature drops, the condition of that the compressor should be shutdown according to the original temperature TS1 set by the control device, the compressor should remain operate, until the thermolator outputs the compressor shutdown signal, and the temperature at this time is recorded again as a new target reference temperature TSnew. Such as, when the inverter air conditioner outdoor unit is under the control of the target reference temperature, when the indoor temperature drops to close to the target reference temperature, the thermolator outputs the compressor shutdown signal. When the control device detects the compressor shutdown signal outputted by the thermolator, the control device detects the current temperature TS2 and saves it through the interface, and updates the target reference temperature of the control device to TS2. When he control device detects the compressor boot control signal of the thermolator again, the compressor operates according to the setting temperature TS2. The control of the air conditioner can be much more accurate, the comfort level is much higher through continuously updating the target reference temperature The executive bodies of the inverter air conditioner control methods based on the themolator from the first exemplary embodiment to the third exemplary embodiment can all be the inverter air conditioner control device based on the themolator. Furthermore, the inverter air conditioner control method based on the thermolatro can be realized by the control program installed on the control of the inverter air conditioner based on the themolator.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. An inverter air conditioner control device comprising:
an outdoor unit communicating interface; and
a controller, the controller being coupled to an outdoor unit through the outdoor unit communicating interface, being coupled to a thermolator, being coupled to a temperature sensor, and being configured to:
in response to receiving a shutdown control signal sent by the thermolator:
control a compressor of the outdoor unit to shut down;
record an indoor temperature signal sent from the temperature sensor; and
set an indoor temperature corresponding to the recorded indoor temperature signal as a target reference temperature; and
in response to the compressor of the outdoor unit being booted up again after being shut down to start a cooling operation and before receiving a signal to turn off the compressor of the outdoor unit:
obtain an initial indoor temperature at the time of booting up again;
set an initial operation frequency of the compressor of the outdoor unit based on the initial indoor temperature and the target reference temperature that was set to be the indoor temperature acquired when the outdoor unit was shut down last time, the initial operation frequency being positively correlated to a difference between the initial indoor temperature and the target reference temperature;
continue to monitor an indoor temperature; and
in response to a difference between the monitored indoor temperature and the target reference temperature being smaller than a threshold, reduce an operation frequency of the compressor.

2. The inverter air conditioner control device according to claim 1, wherein the temperature sensor is installed on the thermolator.

3. The inverter air conditioner control device according to claim 1, further comprising:
the temperature sensor coupled with the controller.

4. The inverter air conditioner control device according to claim 3, wherein the temperature sensor includes a temperature sensor of an indoor unit coupled to the controller.

5. The inverter air conditioner control device according to claim 1, wherein the temperature sensor includes a temperature sensor of an indoor unit coupled to the controller.

6. The inverter air conditioner control device according to claim 1, further comprising:
other interface connected with the controller, the other interface being configured to be connected with a control terminal.

7. The inverter air conditioner control device according to claim 1, wherein the controller is further configured to, in response to the compressor of the outdoor unit being booted up for the first time without a stored target reference temperature, control the compressor to operate at a highest operation frequency of the compressor.

8. The inverter air conditioner control device according to claim 1, wherein the controller is further configured to, in response to the indoor temperature being equal to the target reference temperature, control the compressor to operate at a lowest operation frequency of the compressor.

9. A terminal, comprising an inverter air conditioner control device, the inverter air conditioner control device comprising:
an outdoor unit communicating interface; and
a controller, the controller being coupled to an outdoor unit through the outdoor unit communicating interface, being coupled to a thermolator, being coupled to a temperature sensor, and being configured to:
in response to receiving a shutdown control signal sent by the thermolator:
control a compressor of the outdoor unit to shut down;
record an indoor temperature signal sent from the temperature sensor; and
set an indoor temperature corresponding to the recorded indoor temperature signal as a target reference temperature; and
in response to the compressor of the outdoor unit being booted up again after being shut down to start a cooling operation and before receiving a signal to turn off the compressor of the outdoor unit:
obtain an initial indoor temperature at the time of booting up again;
set an initial operation frequency of the compressor of the outdoor unit based on the initial indoor temperature and the target reference temperature that was set to be the indoor temperature acquired when the outdoor unit was shut down last time, the initial operation frequency being positively correlated to a difference between the initial indoor temperature and the target reference temperature;
continue to monitor an indoor temperature; and
in response to a difference between the monitored indoor temperature and the target reference temperature being smaller than a threshold, reduce an operation frequency of the compressor.

10. The terminal according to claim 9, wherein the temperature sensor is installed on the thermolator.

11. The terminal according to claim 9, wherein the inverter air conditioner control device further comprises:
the temperature sensor coupled with the controller.

12. The terminal according to claim 11, wherein the temperature sensor includes a temperature sensor of an indoor unit coupled to the controller.

13. The terminal according to claim 9, wherein the temperature sensor includes a temperature sensor of an indoor unit coupled to the controller.

14. The terminal according to claim 9, wherein the inverter air conditioner control device further comprises:
other interface connected with the controller, the other interface being configured to be connected with a control terminal.

15. An inverter air conditioner control system comprising:
a thermolator; and
an inverter air conditioner control device comprising:
an outdoor unit communicating interface; and
a controller, the controller being coupled to an outdoor unit through the outdoor unit communicating interface, being coupled to the thermolator, being coupled to a temperature sensor, and being configured to:

in response to receiving a shutdown control signal sent by the thermolator:
  control a compressor of the outdoor unit to shut down;
  record an indoor temperature signal sent from the temperature sensor; and
  set an indoor temperature corresponding to the recorded indoor temperature signal as a target reference temperature; and
in response to the compressor of the outdoor unit being booted up again after being shut down to start a cooling operation and before receiving a signal to turn off the compressor of the outdoor unit:
  obtain an initial indoor temperature at the time of booting up again;
  set an initial operation frequency of the compressor of the outdoor unit based on the initial indoor temperature and the target reference temperature that was set to be the indoor temperature acquired when the outdoor unit was shut down last time, the initial operation frequency being positively correlated to a difference between the initial indoor temperature and the target reference temperature;
  continue to monitor an indoor temperature; and
  in response to a difference between the monitored indoor temperature and the target reference temperature being smaller than a threshold, reduce an operation frequency of the compressor.

16. The inverter air conditioner control system according to claim 15, wherein the temperature sensor includes a temperature sensor of an indoor unit coupled to the controller.

17. The inverter air conditioner control system according to claim 16, further comprising:
the temperature sensor coupled with the controller.

18. A control method of an inverter air conditioner control system,
the inverter air conditioner control system comprising:
  a thermolator; and
  an inverter air conditioner control device comprising:
    an outdoor unit communicating interface; and
    a controller, the controller being coupled to an outdoor unit through the outdoor unit communicating interface, being coupled to the thermolator, being coupled to a temperature sensor, and being configured to:
      in response to receiving a shutdown control signal sent by the thermolator:
        control a compressor of the outdoor unit to shut down;
        record an indoor temperature signal sent from the temperature sensor; and
        set an indoor temperature corresponding to the recorded indoor temperature signal as a target reference temperature; and
      in response to the compressor of the outdoor unit being booted up again after being shut down, adjust an operation frequency of the compressor of the outdoor unit based on the target reference temperature,
the control method comprising:
  receiving, by the controller, the shutdown control signal for the outdoor unit sent by the thermolator when the outdoor unit is in an operation process;
  sending, by the controller, the shutdown control signal to the outdoor unit for shutting down the outdoor unit, and simultaneously acquiring the indoor temperature signal, recording the indoor temperature signal, and setting the indoor temperature corresponding to the recorded indoor temperature signal as the target reference temperature; and
  controlling, by the controller in response to the compressor of the outdoor unit being booted up again after being shut down to start a cooling operation and before receiving a signal to turn off the compressor of the outdoor unit:
    obtaining an initial indoor temperature at the time of booting up again;
    setting an initial operation frequency of the compressor of the outdoor unit based on the initial indoor temperature and the target reference temperature that was set to be the indoor temperature acquired when the outdoor unit was shut down last time, the initial operation frequency being positively correlated to a difference between the initial indoor temperature and the target reference temperature;
    continuing to monitor an indoor temperature; and
    in response to a difference between the monitored indoor temperature and the target reference temperature being smaller than a threshold, reducing the operation frequency of the compressor.

19. The control method according to claim 18, further comprising:
acquiring, by the controller, a real-time indoor temperature signal indicating the monitored indoor temperature in real time.

20. The control method according to claim 19, further comprising:
in response to receiving the shutdown control signal sent by the thermolator while the outdoor unit is operating under the control of the target reference temperature, acquiring, by the controller, a current indoor temperature signal; and
updating, by the controller, the target reference temperature to a temperature corresponding to the current indoor temperature signal.

* * * * *